(12) United States Patent
Pratt et al.

(10) Patent No.: US 11,151,774 B1
(45) Date of Patent: Oct. 19, 2021

(54) ADAPTIVE IMMERSIVE MEDIA RENDERING PIPELINE

(71) Applicant: AT&T Intellectual Property I, L.P., Atlanta, GA (US)

(72) Inventors: James H. Pratt, Round Rock, TX (US); Zhi Cui, Sugar Hill, GA (US); Eric Zavesky, Austin, TX (US); John Oetting, Zionsville, PA (US); Roger Wickes, Gainesville, GA (US); Sherry Simon, Stuart, FL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/953,952

(22) Filed: Nov. 20, 2020

(51) Int. Cl.
 *G06T 15/20* (2011.01)
 *G06T 15/00* (2011.01)
 *G06F 3/01* (2006.01)

(52) U.S. Cl.
 CPC .............. *G06T 15/20* (2013.01); *G06F 3/011* (2013.01); *G06T 15/005* (2013.01)

(58) Field of Classification Search
 None
 See application file for complete search history.

(56) References Cited

U.S. PATENT DOCUMENTS

| | | | |
|---|---|---|---|
| 2017/0038830 A1* | 2/2017 | Clement | A63F 13/212 |
| 2017/0200308 A1* | 7/2017 | Nguyen | G06T 15/005 |
| 2019/0163267 A1* | 5/2019 | Hainzl | G02B 27/0977 |
| 2019/0287495 A1* | 9/2019 | Mathur | G06T 15/00 |

* cited by examiner

*Primary Examiner* — Vu Nguyen
(74) *Attorney, Agent, or Firm* — Guntin & Gust, PLC; Dana Lemoine

(57) ABSTRACT

Aspects of the subject disclosure may include, for example, providing an immersive environment accessible by a plurality of user devices associated with a plurality of users, assigning rendering resources for rendering the immersive environment, detecting a user interaction by a user with a virtual object in the immersive environment, rendering the virtual object in full detail, and rendering other objects in the immersive environment in less than full detail to reduce requirement for rendering resources for the immersive environment. Other embodiments are disclosed.

20 Claims, 10 Drawing Sheets

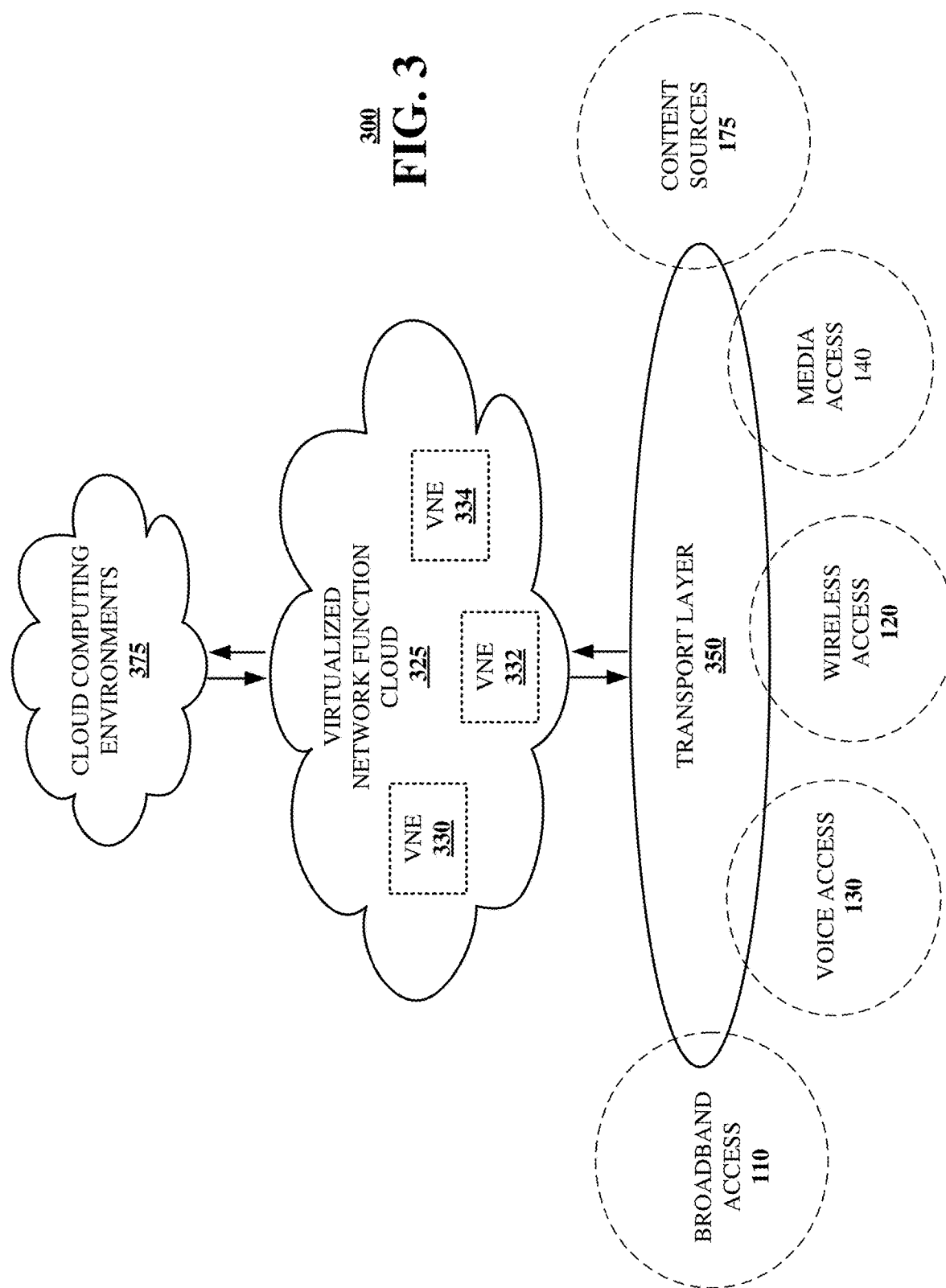

ADAPTIVE IMMERSIVE MEDIA RENDERING PIPELINE

FIELD OF THE DISCLOSURE

The subject disclosure relates to a reducing network resource requirements and computing resource requirement in immersive media systems.

BACKGROUND

Extended reality (XR) systems create immersive experiences that may be enjoyed by a wide variety of users. The types of immersive experiences that such systems create are more and more created automatically by computer systems.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

The subject disclosure describes, among other things, illustrative embodiments for reducing communication network resource requirements and computer resource requirements when rendering an immersive environment. A user's change of attention, including visual attention, is detected or a user's travel in the immersive environment is detected, and only objects and materials that are the subject of user attention or travel receive detailed rendering in order to conserve or minimize use of network and computing resources. Other embodiments are described in the subject disclosure.

One or more aspects of the subject disclosure include providing an immersive environment accessible by a plurality of user devices associated with a plurality of users, assigning rendering resources for rendering the immersive environment, detecting a user interaction by a user with a virtual object in the immersive environment, rendering the virtual object in full detail, and rendering other objects in the immersive environment in less than full detail to reduce requirement for rendering resources for the immersive environment.

One or more aspects of the subject disclosure include establishing an immersive environment accessible by a plurality of users, each respective user accessing the immersive environment with a user computing device over a communications network, assigning rendering resources for the plurality of users, detecting a user interaction in the immersive environment by a user of the plurality of users, and reassigning rendering resources to accommodate the user interaction, wherein the reassigning rendering resources is responsive to the detecting the user interaction.

One or more aspects of the subject disclosure include establishing an immersive environment accessible by a plurality of users, each respective user accessing the immersive environment with a user computing device over a communications network, determining rendering resources required by each respective user of the plurality of users, the rendering resources sufficient to support an immersive experience for each respective user, prioritizing objects within the immersive environment to form an object priority, wherein the prioritizing is according to a priority to a respective user, wherein the prioritizing is based on estimating an attention level of the respective user on the objects, and adjusting the rendering resources assigned to each respective user according to the object priority, wherein the adjusting reduces rendering resources for objects having less than a highest object priority.

Figure 1:
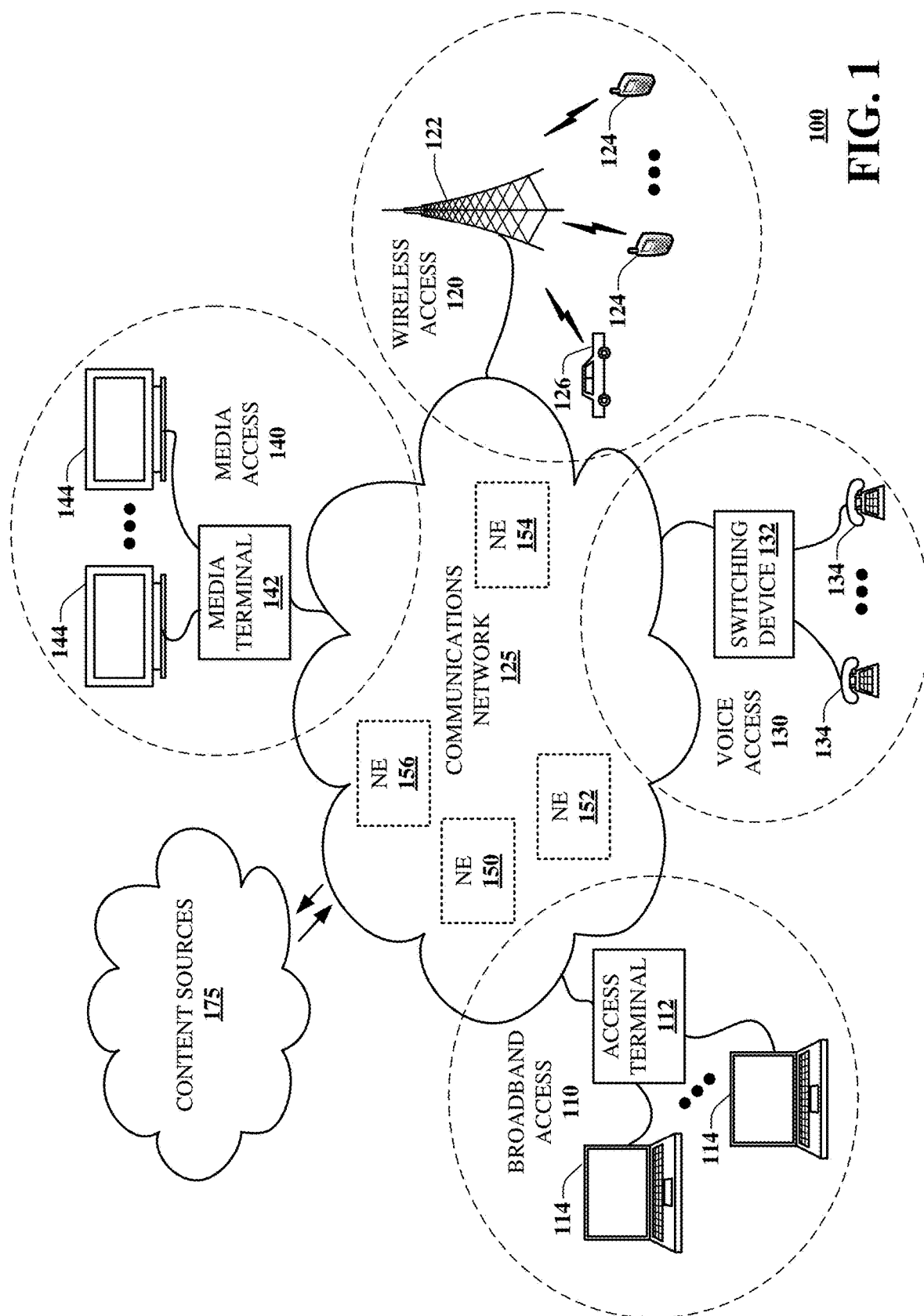
FIG. 1 is a block diagram illustrating an exemplary, non-limiting embodiment of a communications network in accordance with various aspects described herein.

Referring now to FIG. 1, a block diagram is shown illustrating an example, non-limiting embodiment of a system 100 in accordance with various aspects described herein. For example, system 100 can facilitate in whole or in part establishing an immersive environment accessible users, and assigning and reassigning rendering resources based on user interactions in the immersive environment. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

One application for a communications network such as communications network 125 is establishing an extended reality or XR environment for multiple users. An XR environment provides an immersive experience for a user and can be used for entertainment, education, co-working and other purposes. Users with local equipment such as XR headsets can access the XR environment over a network. XR environments can be very complex virtual worlds to manage in order to provide a convincing immersion for the player. This immersion can require an abundance of network and compute resources that may not be available. Current solutions crudely "fog" the environment or provide low-resolution rendering.

Providing optimum immersion involves load balancing compute resources against acceptable lag time and becomes a significant issue to manage. Out of the users' control, network resources such as available bandwidth are constantly in flux. Within the world, the amount of detail needed to render the world also changes based on user actions in the virtual world.

Resources, assets and renderings can be prioritized based on prior interactions with an object, as well as detected attention and anticipated direction of travel. In truly constrained environments, one user may require majority attention for an object, but there is currently no way to attenuate non-essential interaction with a portion of an XR experience that is not being attended to.

Figure 2A:
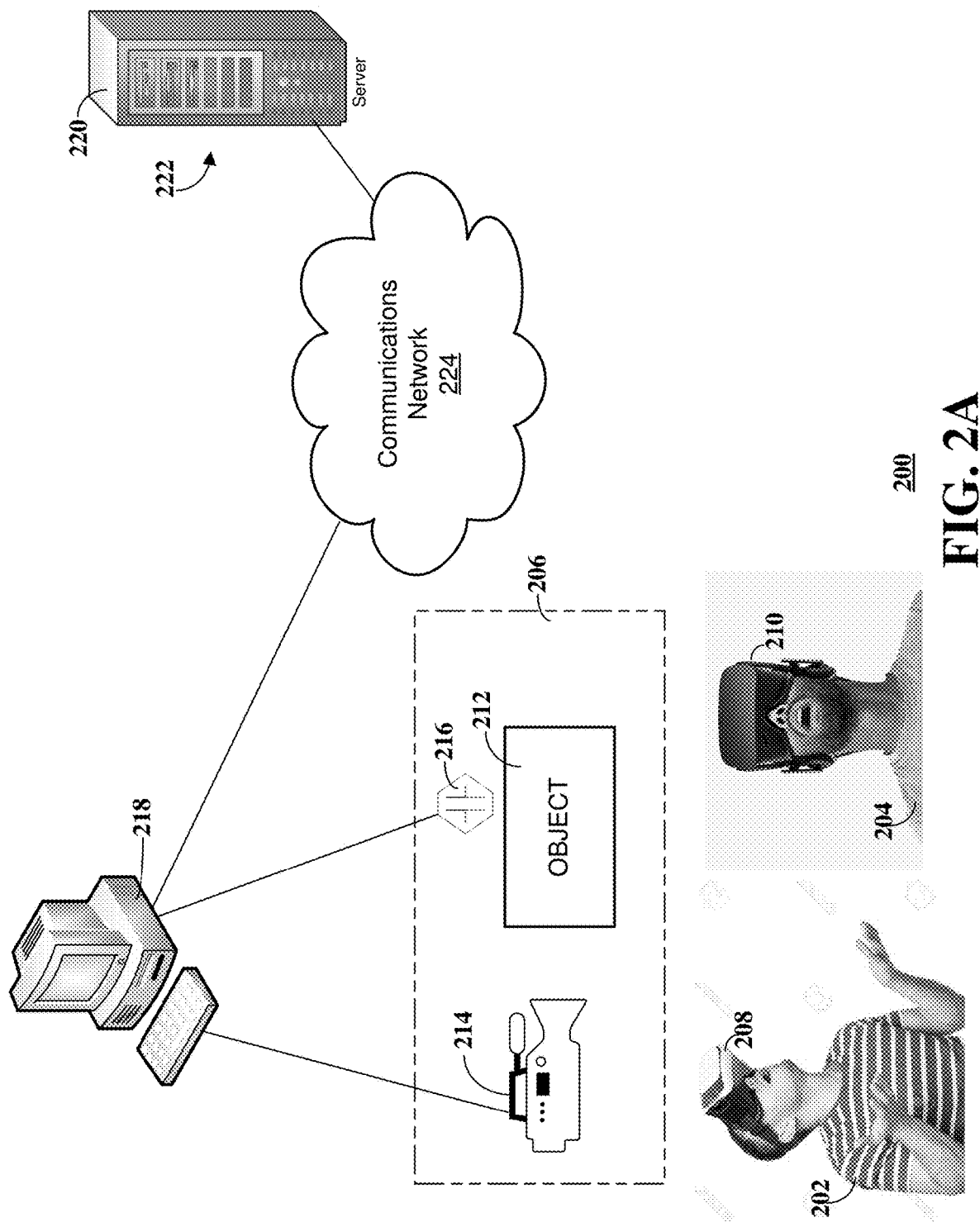
FIG. 2A is a block diagram illustrating an example, non-limiting embodiment of a system functioning within the communication network of FIG. 1 in accordance with various aspects described herein.

FIG. 2A is a block diagram illustrating an example, non-limiting embodiment of a system 200 functioning within the communication network of FIG. 1 in accordance with various aspects described herein. In the example embodiment, the system includes an XR environment or XR experience 206, XR equipment including an XR headset 208 and XR headset 210, one or more cameras 214, one or more sensors 216, a user computer 218. The system 200 may have particular utility in conjunction with an extended reality (XR) environment. In an embodiment, FIG. 2A illustrates an example of a multi-player XR experience 206. In the illustrated example, a first user 202 and a second user 204 interact with the XR experience 206. Each of the first user 202 and the second user 204 wears equipment such as a headset to allow the user to see the virtual reality experience 206 using immersive technology. In this example, the first user 202 wears an XR headset 208 and second user 204 wears an XR headset 210.

The XR experience 206 may present the widest variety of XR environments, including simulations, games, demonstrations, travel experiences, etc. One example of the XR experience is a massively multiplayer online role playing game (MMORPG). The presented XR environments may be wholly artificial or virtual or may be augmented versions of actual environments or locations. The XR experience 206 may include any number of users such as user 202 and user 204 and their avatars. The XR experience 206 may include any number of objects such as object 212. The objects including object 212 may be static and unchanging, such as a portion of terrain in a scene or a goal post in an XR game. In some examples, the objects including object 212 may be dynamic and move with a trajectory determined automatically or may change size, shape or any other property under automatic control. The users including user 202 and user 204 may interact with the objects including object 212. In the example of a MMORPG, each player assumes the role of a character and is represented by an avatar, such as in a fantasy world, and takes control over the character's actions. Players and their characters interact together in a persistent world which evolves during playing of the game.

In some examples, the XR 206 experience may include a portion of a physical environment, such as a game field, a playground, a classroom or an area of terrain. In order to collect information about the physical environment, the system 200 may include one or more cameras such as camera 214 to capture still or motion pictures of the environment of the XR experience 206. Further, the system 200 may include one or more sensors 216. The cameras may collect visual images, infra-red images and others. The sensors 216 may include environmental sensors that collect information such as temperature, wind speed, orientation or acceleration, or other physical factors of the environment where the user 202 and user 204 are located. If a user is operating a vehicle, the sensors 216 may detect vehicle speed and steering, acceleration and braking inputs by the user. If the vehicle is a driver assisted vehicle, the sensors 216 may collect all information available to the driver assistance system such as images from cameras, navigation and location data, data from Lidar sensors, and others. The sensors 216 may further gather information about the users including the user 202 and the user 204. Such information may include biometric information, such as pulse rate or respiratory rate, skin conductivity, pupil dilation, haptic information about one or more touches of the user, and so forth. Thus, the sensors 216 may include or be part of a wearable device such as a watch, belt or harness. Further, such user data may include information about the position, posture and movement of the user. Any sort of data that may be useful by the system 200 for monitoring the users and controlling the XR environment 206 may be sensed by the sensors 216. In some embodiments, the sensors 216 merely sense a condition and report information. In other embodiments, one or more of the sensors 216 may be controllable, such as by the user computer 218.

The user computer 218 is in data communication with the XR headset 208, the XR headset 210, the camera 214 and the sensors 216. In the illustrated embodiment, the user computer 218 has wireline connections to the camera 214 and the sensors 216 and wireless connections to the XR headset 208 and the XR headset 210. The wireless connections may be any suitable wireless format such as a WiFi connection according to the IEEE 802.11 family of standards or a Bluetooth connection according to the Bluetooth standard. In other embodiments, the wireline connections and wireless connections may be interchanged or replaced according to convenience.

The user computer 218 cooperates with the XR headset 208 and the XR headset 210 to provide the XR environment 206 for the user 202 and the user 204. The user computer 218 communicates with the XR headset 208 and the XR headset 210 to provide video information, audio information and other control information to the XR headset 208 and the XR headset 210. The user computer 218 communicates with the sensors 216 to collect information about the physical environment and the user 202 and the user 204. The user computer 218 communicates with the XR server 220 to provide video and other information from the XR headset 208 and the XR headset 210 to the XR server 220 and to provide information and data from the sensors 216 to the XR server 220. The video and data may be sent in any suitable format, including encoding to reduce the amount of data transmitted or encrypted to maintain security of the data. The user computer 218 communicates to the XR headset 208 and the XR headset 210 virtual reality information to the XR headset 208 and the XR headset 210. In some embodiments, the functionality provided by the user computer 218 may be combined with the XR headset 208, the XR headset 210, or both. In the embodiment of FIG. 2A, the user computer 218 is shown as a desktop computer. However, any suitable processing system, including one or more processors, memory and a communications interface, may implement the functions of the user computer 218.

The XR server 220 controls provision of the XR environment 206 including immersive experiences to the XR headset 208 and the XR headset 210 for the user 202 and the user 204, respectively. The XR server 220 generally includes a processing system including one or more processors, a memory for storing data and instructions and a communications interface. The XR server 220 may be implemented as a single server computer, as multiple server computers at one or multiple locations or in any suitable manner. In the system 200, the XR server 220 implements an extended reality (XR) engine 222.

The XR server 220 receives over the communications network 224 information about the XR experience 206 of the user 202 and the user 204, including location information, information about objects such as the object 212 in the XR experience 206 and events occurring in the XR experience 206. The XR server 220 in some embodiments may further receive information about users including the user 202 and the user 204, including biometric information and information about the performance of the users. The information may come from the sensors 216, the XR headset 208 and the XR headset 210, or any other source. Under control of the XR engine 222, the XR server 220 provides control information over the communications network 224 including video information, sound information, haptic information and any other information, including instructions and data, to the other components of the system 200 including the user computer 218, the XR headset 208 and the XR headset 210.

The XR engine 222 develops the XR environment 206 as a combination of the actual environment in which users including the user 202 and the user 204 are located and a simulated or virtual environment. The XR engine 222 retrieves data and other information defining an immersive experience. The information defining the immersive experience may be stored at a memory of the XR server 220 or at another location accessible by the XR server 220. In other examples, the information defining the immersive experience may be received from another location or source as streaming data. The XR engine 222 develops the immersive experience 206 for users including the user 202 and the user 204 based on the received information defining the immersive experience 206.

Immersive technology allows creation of an immersive experience for users such as user 202 and user 204. An immersive experience includes or presents an environment that is, at least in part, illusory and that seems to partially or completely surround the user so that the user feels to be inside the immersive experience and to be a part of the immersive experience. An immersive experience or environment allows the user to experience some things that are physically impossible. An immersive experience may have the effect of augmenting reality or the real world by combining real world features, or supplementing them or replacing them, with artificially created features. Providing specific examples, an immersive experience can vary from a virtual reality (VR) game that places the user in a situation where she or he must escape from a scene or situation. Depth of the immersion is enhanced with visuals, audio, and a narrative where one or more virtual characters demonstrate adversarial views. In another example, one or more users may be in an immersive experience while touring certain areas of a national park, like the Grand Canyon. As part of an augmented reality (AR) experience, boulders fall during a simulated earthquake to demonstrate the chaos of nature. Examples of non-immersive experiences include a VR game about math that uses simple numbers, sounds, and a flat display to demonstrate addition, or an AR system that generates only textual enhancements (e.g. floating graphical signs) to a painting in a museum display. To further differentiate, if either the VR game or the AR system above were modified to include demonstrations from historical figures, direct addressing of the user, or any activity that invokes the philosophical phrase "suspension of disbelief" or "suspension of judgment concerning the implausibility of the narrative," each may be considered an immersive experience.

Immersive technology includes equipment such as VR headsets, AR smart glasses, audio speaker systems and computer control to create immersive experiences. For example, AR systems use technology such as an AR headset and the camera and screen on a smartphone or tablet computer to add a computer-simulated layer of information on top of real world features. AR technology is an enhancement of the world surrounding the user. VR systems go a step further and immerse the user in a wholly artificial world, a digital simulation and creation with which the user can interact. A VR system will seek to stimulate as many user senses as possible to immerse the user in the simulated environment, including sight, hearing and touch. Extended reality (XR) refers to environments that combine real and virtual environments and permit human and machine interactions. An XR environment may be generated by computer equipment and be may implemented by wearable technology such as a headset or glasses. XR technology may be considered to incorporate AR, VR and other technologies for immersive experiences. As used herein, an immersive environment, an immersive experience, an XR environment, and a scene generally refer to a combination of real and virtual environments for a user under automatic machine control and with which the user may interact.

In the future, more and more VR and XR experiences will be computer generated. A computer implementing a gaming system or other VR or XR engine will create immersive experiences for users according to user interests. The computer may automatically generate the XR experience as a free-form experience rather than as a guided experience for the user. The computer-generated experience, in particular, may bring new types of problems or risks or even dangers for users who interact in immersive experiences. For example, as shown in FIG. 2A, there may be multiple users interacting inside a virtual experience. The XR experience may include avatars for each user.

In some XR environments, users interact with each other substantially in real time. In one aspect, network resources may need to render features of the XR environment, avatars, objects within the environment and other components as well. Such resources may include physical resource blocks (PRBs) and virtualized components in a network. Such resources may also include bandwidth, packet priorities and computing power assigned to rendering the XR environment. Such resources may generally be called rendering resources. Rendering resources may include hardware and software needed to render an XR experience. Rendering resources may further include characteristics of hardware or software used to render an XR experience, such as bandwidth of a network. In this example, bandwidth refers to a capacity of a data network such as communications network 224 to communicate data and may be expressed, for example in megabits per second (MBps). Computing power refers to the ability of a data processing system to process the necessary data to represent the XR environment, including fetching data and instructions from storage, performing data manipulations including manipulations to render the images, sound and other aspects of the XR environment substantially in real time and to provide data to equipment such as XR headsets worn by users. If insufficient rendering resources are available, the user may experience delays or other poor performance in rendering the XR experience.

The computing power and availability of network resources of the user computer 218, the XR server 220 and the XR headset 208 and the XR headset 210 may limit the ability to render a realistic XR environment. The system 200 must represent users in the XR environment or XR experience 206 in a way that is accurate and reliable. This includes the relationship and positioning of avatars within the virtual environment. Being able to represent the environment appropriately also helps with the immersion aspect of the environment and the sense of a user being in the virtual environment with other people.

The representation of the XR experience, including movement of objects and avatars, positioning of objects and avatars and other visual details, are updated by the system 200 creating the XR experience. Some XR experiences have a great deal of information such as textures of surface or materials, a large number of objects some of which may be moving in response to user actions, and possibly a large number of users or their avatars that may be moving. However, those features may not appear as realistic as desired or may be rendered slowly or with a delay, if the rendering process is limited by insufficient computing power, memory space or communication bandwidth. Therefore, in some embodiments, the system 200 including the XR server 220 predicts or computes resources and assets within the XR experience 206. This prediction may be based upon information such as how objects are interacting, directions of travel of moving objects, and visual attention of users. This presents features of the XR experience 206 such as material, avatars and objects in a more realistic manner to maintain the immersion for users such as user 202 and user 204.

Conventional XR systems may handle limitations on computing resources and bandwidth by pre-determining or pre-programming interactions. In some examples, an XR server will download to an XR device or personal computer or game engine a level and render the virtual world for the entire level with the game engine. The virtual environment defines a route through the level and the player or the player's avatar must travel down the route. The character is not permitted to be free-roaming. In contrast, in a free-roaming situation, the character can go anywhere, look at anything in the virtual world without limitations. There is no predetermined game route through which a character must proceed. A free-roaming world creates a substantial requirement for predicting where a user or character may go and experiences the character might have.

Other conventional XR systems handle limitations on computer resources and bandwidth by reducing details on objects or features that are distant in the virtual world from the character. A process of distance-based fading is used in that distant objects are render with low quality or low visual detail. Rather than show distant details, the XR experience may introduce fog or mist or some other generally featureless item so that the rendering engine does not have to render detail in the distance. Games may conventionally create walls or tunnels to reducing the rendering requirements.

Some conventional XR systems, like massively multi-player online role playing games, calculate a player position. The client device of a user estimates that position, but does not optimize based on expected direction of player travel or player attention. A system and method in accordance with various aspects described herein calculates only those changes needing immersive calculation and network communication due to expected travel and attention in the XR environment. Moreover, the system and method provide a user-centered basis for determining network and computing resource requirements based on run-time visual focus, audio focus or travel of the user.

In an XR system and method in accordance with various aspects described herein, computing resources for rendering an XR experience is based on selected factors. A first factor for assigning computer resources is where a user's visual attention is looking in the XR experience. This may be determined by monitoring the user's visual focus or where the user is looking, for example by the XR headset 208 worn by the user 202 in FIG. 2A. Similarly, the user's audio focus may be monitored to determine where the user is listening. The area where the user is looking or listening will receive relatively more computing resources to render that area with greater detail and with more fidelity and to more realistically make the experience more immersive for the user. The area where the user is looking may be rendered with full detail and other areas may be rendered with less detail.

A second factor for assigning computer resources is a prediction of where in the XR experience the user is most likely to travel to or objects the user is likely to interact with. The XR system may use a predictive artificial intelligence (AI) engine to predict the user's activity based on past experience. Further in some embodiments, the XR system may have historical knowledge of the user including the user's history in the XR experience, the user's preferences, etc. This may be in the form of a user profile for the user. The user profile may include information provided or entered by a user, such as by accessing a user interface. The user profile may include information collected or observed about a user, such as where the user has travelled in the environment, objects or situations the user has pursued or avoided, and other information as well. Such information may be accessed by the predictive AI engine to identify portions of the XR experience that should receive more computing resources. Likely destinations of the users receive relative more computing resources to render the areas of those destinations with greater detail and more realistically and with more fidelity. Such likely destinations are rendered with full detail and other areas are rendered with less detail.

A third factor for assigning computer resources is a determining of objects and materials in the XR experience the user will affect. In effect, each object or material in an XR experience has buffer zone or influence zone surrounding it. As a moving object enters the buffer zone of another object or material, the other object or material will begin to be assigned computing resources to prepare for interaction with the moving object or motion imparted by the moving object. The other object or material will be rendered in full detail while other, secondary objects are rendered in less detail.

Figure 2B:
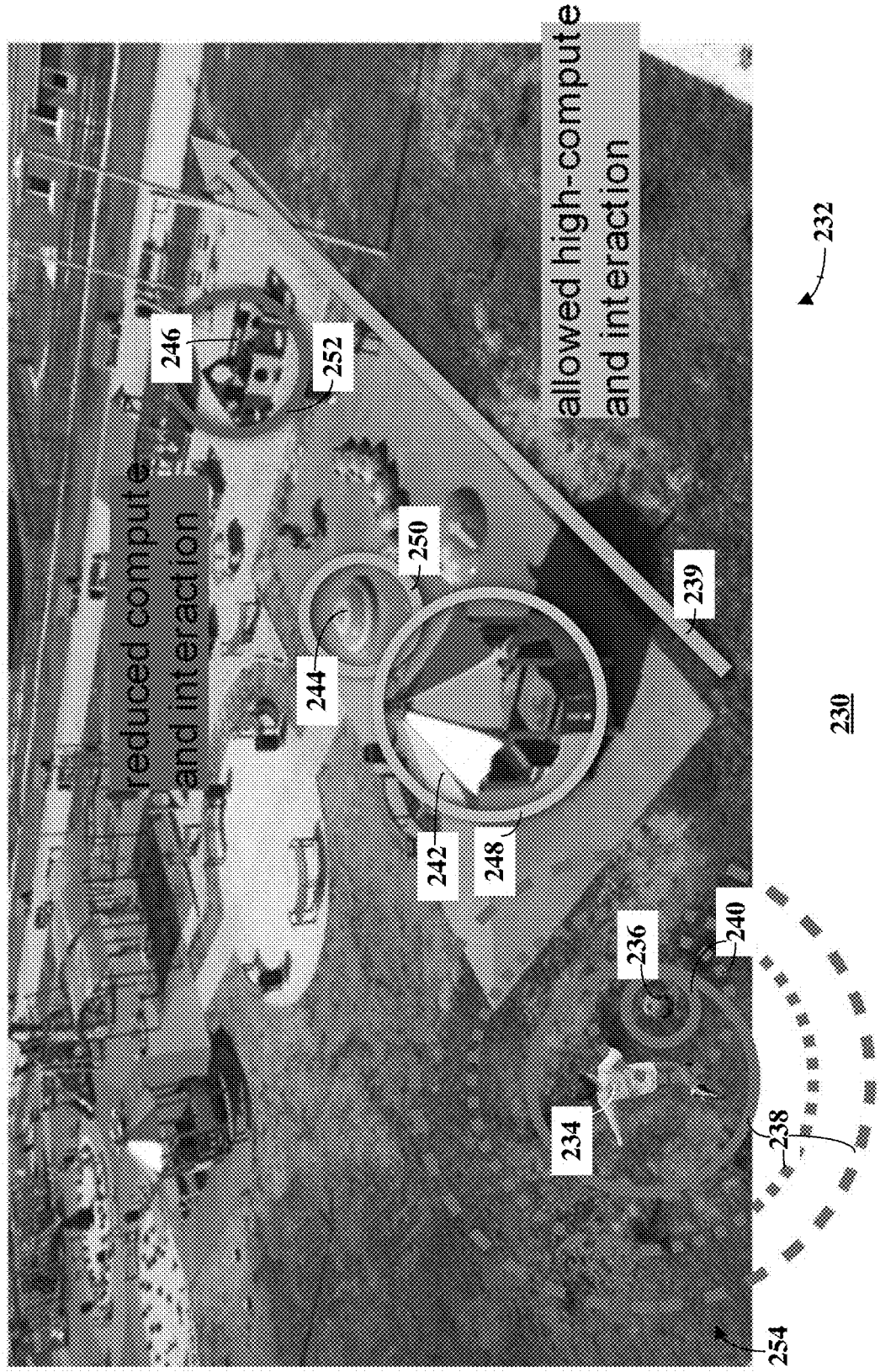
FIG. 2B is an illustrative embodiment of an XR environment in accordance with various aspects described herein.
Figure 2C:
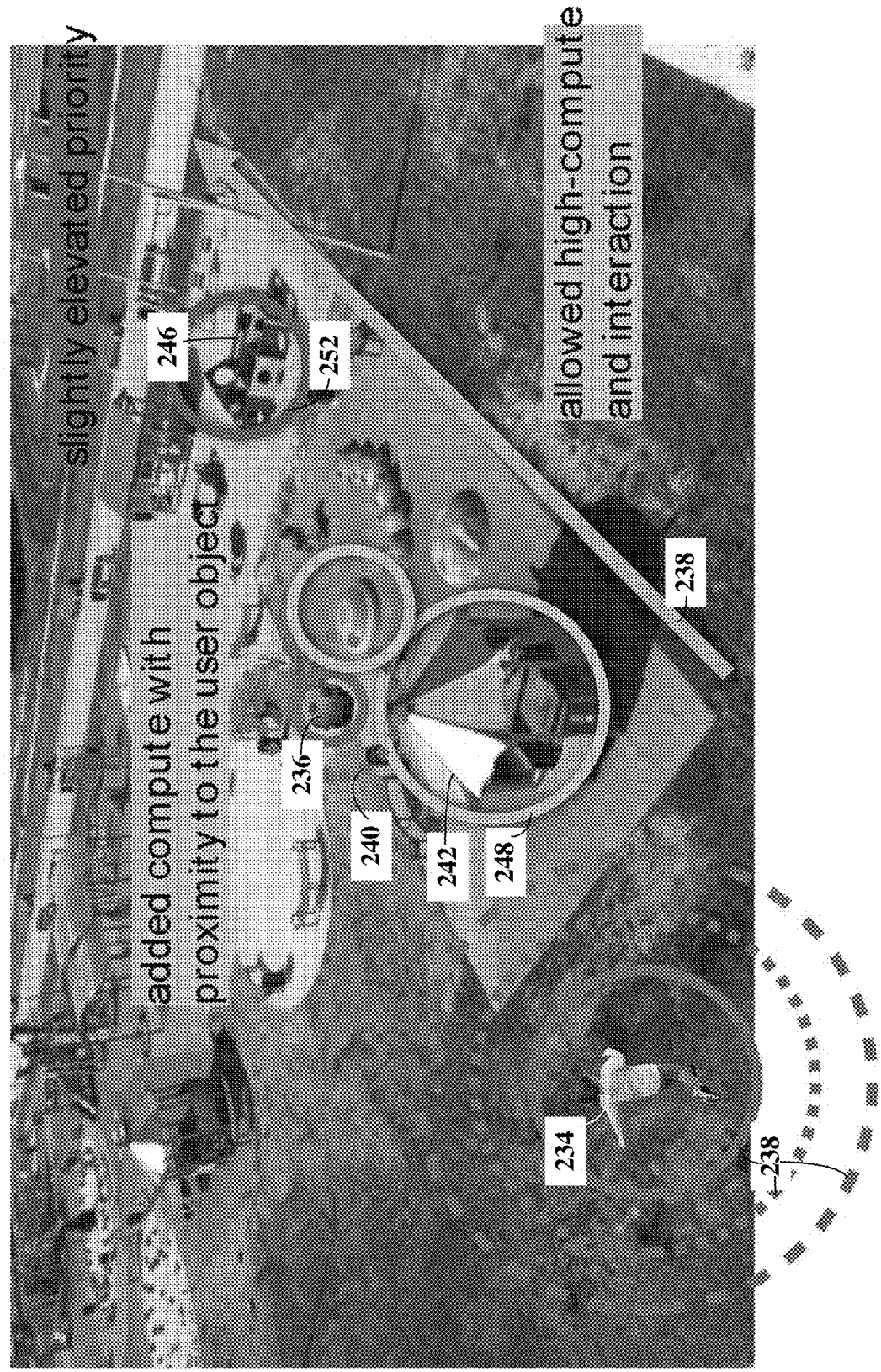
FIG. 2C is an illustrative embodiment of the XR environment of FIG. 2B, at a subsequent time, in accordance with various aspects herein.

FIG. 2B is an illustrative embodiment of an XR environment 230 in accordance with various aspects herein. Similarly, FIG. 2C is an illustrative embodiment of the XR environment 230, at a subsequent time, in accordance with various aspects herein. The XR environment 230 shows a portion of a virtual child's playground 232. The XR environment 230 may represent an exemplary scene as viewed by a user with suitable XR equipment, such as the user 202 with XR headset 208 in FIG. 2A. The XR environment 230 in FIG. 2B includes a child 234 about to kick a ball 236 along a trajectory 239. The XR environment 230 in FIG. 2C is the same XR environment 230 but at a later time, after the child 234 has kicked the ball 236 and the ball 236 is moving in the air among the objects on the playground 232. The playground 232 further includes other playground furniture including a carousel 242, a bouncer 244 and a playhouse 246. Each object has a buffer zone or influence sphere surrounding the object in space. Thus, the child 234 has an influence sphere 238. The ball 236 has an influence sphere 240. The carousel 242 has an influence sphere 252. The bouncer 244 has an influence sphere 250. The playhouse 246 has an influence sphere 252. The child 235 stands or walks on a grass surface 254.

The XR environment 230 illustrates how computing resources of an XR system may be assigned to features of the XR environment 230 to most efficiently use limited computing resources. In effect, as the user or the user's avatar focuses attention on an object or touches an object in the XR environment, that process gives life to the object. In the example, the child 234 kicks the virtual ball 236 along the trajectory 239. Because the user controls the user's avatar, the child 232, the user's visual focus is directed to the child in the scene of the XR environment 230. That gives life to the ball 236, meaning that the computer processing resources become focused on the ball 236 to more accurately and completely render the ball 236 and the child 234. In contrast, other objects in the playground 232 that are not being touched by the child 234 or are not part of the visual focus of the user because they are remote from the child, get relatively fewer processing resources and are rendered less accurately and possibly less completely. For example, as the child 234 kicks the ball 236, visual details of the child 234 are repeatedly updated to reflect the motion of the child. As the child 234 contacts the ball 236, the processing resources in turn are focused on the ball 236, such as by updating the appearance of the ball and tracking the movements of the ball 236, including the physics of the ball's motion. In contrast, during the time when the child 234 kicks the ball 236, relatively few computing resources are focused on features of the XR environment 230 other than the child 234 and the ball 236. For example, if there is motion elsewhere in the XR environment 230, the motion may not be updated as frequently as the motion of the child 234 and the ball 236. Similarly, visual details of features of the XR environment 230 away from the child 234 and the ball 236 may be blurred or dimmed or reduced from color rendering to black and white to conserve processing resources and focus processing resources on the moving child 234 and ball 236.

As the child 234 gives life to the ball 236, meaning transferring computing resources to the ball 236 to more accurately render the ball 236 and follow its trajectory according to physics, the ball 236 in turn gives life to other objects as the 236 moves away from the child 234 along the trajectory 239. Thus, the ball 236 moves toward the carousel 242 so the carousel 242 comes to life in the XR environment 230. That is, the carousel begins to receive additional computing resources to more fully and reliably render the carousel 242. This may mean showing more details of the shape and texture and color of the carousel. If the ball 236 contacts the carousel 242, the XR system tracks the physics of the ball 236 and the carousel 242 in detail. That is, if the ball 236 caroms off the carousel, the trajectory of the ball is tracked and displayed closely by applying sufficient processing resources to the ball 236. If the ball 236 is deformed during the process of striking the carousel 242, the deformation is closely rendered, in high detail, by dedicating sufficient resources to the deformation. Similarly, if the carousel 242 begins moving after being struck by the ball 236, the moving carousel is rendered in high detail by devoting sufficient resources to the process of tracking the motion of the carousel 242 and rendering its motion, shape, color and other features.

In contrast to applying sufficient computing resources to the rendering of the child 234, the ball 236 and the carousel 242, other objects in the XR environment 230 are assigned less computing resources. Thus, the bouncer 244 and the playhouse 246 are assigned less computing resources. This permits limited computing resources, such as processor time, memory space and data communications capacity such as bandwidth, to be assigned to objects that are moving or that are the focus of the user's attention or that are predicted to become active. The bouncer 244 and the playhouse 246 may as a result appear static or may be rendered with less detail such as texture or color. The processing system rendering the scene of the XR environment 230 does not update appearance of the bouncer 244 or the playhouse 246 frequently or at all so that no processing resources are wasted or devoted to those objects and so that more or all processing resources may be devoted to the objects that are moving or are predicted to be moving or are the focus of attention.

As noted, each object has an influence sphere. Thus, the child 234 has an influence sphere 238 indicated by circular lines about the child 234 in the XR environment. Similarly, the ball 236 has an influence sphere 240 indicated by circular lines about the ball 236. Such lines are for explanation only and do not appear in the view of the XR environment 230 presented to the user. The influence spheres 238, 240 indicate a region around an object within which another object will begin to receive relatively more computing resources based on movement or activity or attention levels in the XR environment 230. For example, the closer a user looks at an object, the more detail is seen and needs to be shown or rendered. As the XR system which renders the XR environment 230 processing the scene, the XR system monitors each influence sphere for each object. As an object moves so that its influence sphere includes all or a portion of another object, the moving object gives life to the other object. That is, the moving object is assigned a large proportion of computing resources so that the moving object may be rendered with high accuracy and fidelity. As its influence sphere engages or touches another object, the other object is assigned computing resources, or some of the computing resources that are assigned to the moving object. In FIG. 2B, as the child 234 moves near the ball 236, the XR system detects that the ball 236 become within the influence sphere of the child 234. As a result, the XR system assigns additional processing resources to the ball so that the ball may be rendered with more fidelity. Other objects in the scene, such as the bouncer 244 and the playhouse 246, are assigned fewer computing resources. This ensures that limited computing resources, such as processing power, memory and communications capacity such as bandwidth, are assigned to objects requiring the most accuracy and fidelity.

Similarly, the influence spheres 238, 240 may be used as an object moves to give life to objects based on visual attention. In the scene of FIG. 2B, as the child 234 moves and approaches the ball 236, the user's visual focus is on the moving child. The visual focus of the user may be determined in any suitable fashion, such as monitoring eye movements of the user wearing XR headset. The XR headset determines where in the scene the user is looking and what spot or area the user's vision is focused on. Using information about the user's visual focus and information about the influence sphere 238 of the child, the XR system can give life to objects, materials and surfaces within the influence sphere 238 of the child 234. In the example of FIG. 2B, the grass surface 254 on which the child 234 stands is given life by the XR system because the child 234 stands on the grass surface 254. That is, while the child 234 moves or stands on the grass surface 254, a portion of the grass surface 254 that is within the influence sphere 238 of the child 234 is rendered with greater accuracy and fidelity by assigning that area relatively greater computing resources. For example, the XR system may render individual blades of grass or clods of dirt for portions of the grass surface 254 that are within the influence sphere 238 of the child 234, but only render a smooth green surface for portions of the grass surface 254 that are outside the influence sphere 238 of the child. This helps to ensure that the area surrounding the portion of the XR environment 230 that is the visual focus of the user is rendered with highest fidelity and appears true to life.

This helps to maintain the immersive experience for the user viewing the XR environment 230.

While the influence spheres 238, 240 are shown as having a spherical shape, any shape, such as a cube or cone, or any size, may be used. Also the influence spheres 238, 240 may use a dynamic size or shape, depending on conditions or events of the XR environment 230. The size or shape or reaction or effect of an influence sphere may be affected by the user's profile or information that has been collected about the user or the user's avatar. For example, if the user associated with the child 234 has shown an interest or affinity for soccer, the XR system may conclude the user is likely to kick the ball 236 and so the influence sphere for the user relative to the ball may be larger. One effect of this would be that, for the user associated with the child 234, the ball would receive a greater proportion of computing resources and be rendered with greater fidelity when the child 234 was farther away from the ball 236 compared to another user with no affinity or history for soccer or ball-kicking. Based on the history of the user associated with the child 234 with kicking balls, an AI engine might conclude that the user associated with the child is likely to see the ball 236 in the XR environment 230 and therefore render the ball with greater precision even when the child 234 is relatively distant from the ball.

Other historical information and profile information for users can be used in a similar fashion to affect which portions of an XR environment are rendered with greater or lesser precision for a given user. The system and method provide a role-based attention and XR promotion and activation. Depending on the role of a particular user, that user may have ability to control the high-detail rendering of portions of the XR environment or virtual objects, depending on what the user touches or where the user turns the user's attention. In an example one user may be designated as having a higher priority within the immersive experience. For example, if two users are cooperating as a team, one may be designated the team leader or guide and get higher priority. Thus, for example, when two users are looking at different objects, the object viewed by the higher-priority user may itself receive a higher priority or be rendered more fully. Similarly, if the team leader is holding an object, the object may be given more compute resources relative other objects. Further, if the high-priority individual takes an action with an object, such as throwing the object, the object may in some embodiments take on the priority of the individual. Thus if the thrown object collides with another object, the thrown object may have a stronger effect. Information such as a user priority or user status may be maintained in and read from the user profile.

In another example, an object may develop or receive an influence sphere based on an external event, rather than inheriting an influence sphere from another object. An example is a physical server computer represented by a virtual server in a virtual room. Because of a malfunction, the server has a flashing red light that indicates the malfunction. However, in this example, the server does not normally have an influence sphere but because of the malfunction, it develops or is assigned an influence sphere by the XR experience. When a user moves near to the server or sees the server, as determined by the XR system, the influence sphere activates and causes the red light to flash in the virtual world. The normally dormant server becomes active due to the external event.

Figure 2D:
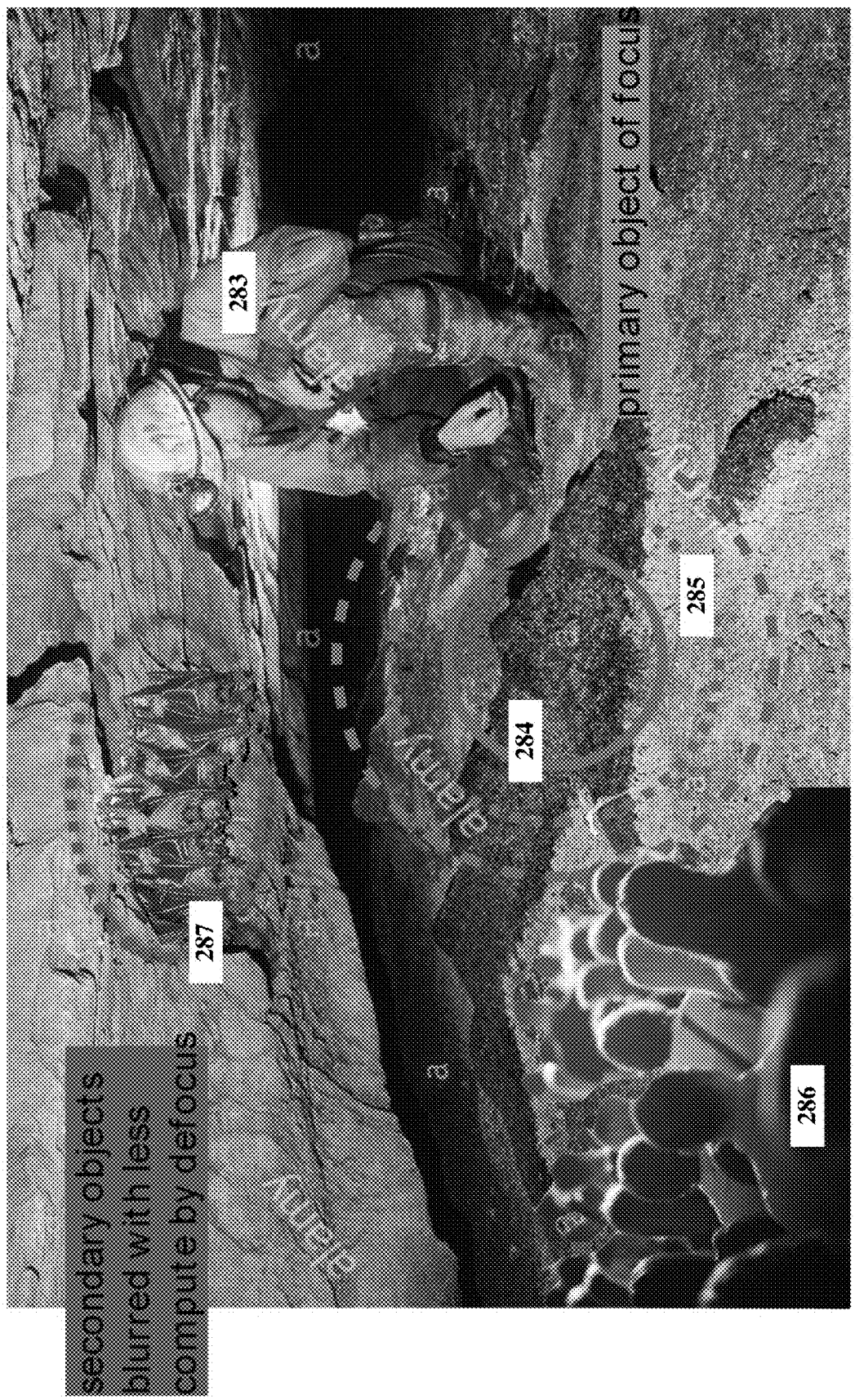
FIG. 2D is an illustrative embodiment of an XR environment in accordance with various aspects herein.

FIG. 2D is an illustrative embodiment of an XR environment 282 in accordance with various aspects herein. FIG. 2D is an example of an XR experience in which a virtual group leader 283 is viewing an object 284. The group leader 283 is associated with a user equipped with an XR headset or other equipment. The object 284 has an influence sphere 285. The group leader 283 and the object 284 are viewed by a virtual audience 286, which may include one or more users equipped with XR headsets or other equipment. In the XR environment 282, there are other secondary objects such as bats 287.

The group leader 283 is showing or demonstrating the object 284 and wants the audience to look in the direction of the object 284. Initially, with the group leader 283 about the same distance from the primary object 284 and the secondary object, the bats 287, the system and method render both the primary object 284 and the secondary object with the same degree of precision or fidelity. However, the group leader 283 has a relatively high priority so the object of his visual focus, the primary object 284, remains rendered in high detail. Secondary objects in the XR environment 282, such as the bats 287, are rendered in less detail. They may appear out of focus or blurred relative to the primary object 284. The primary object gets a higher rendering priority than secondary objects. Members of the virtual audience 286 will not get a high quality rendering of the secondary objects streamed to their XR devices. This can optimize use of computing resources and rendering resources and, for audience members with slow connections or other computing resources, this can improve their experience with the XR environment 282.

Figure 2E:
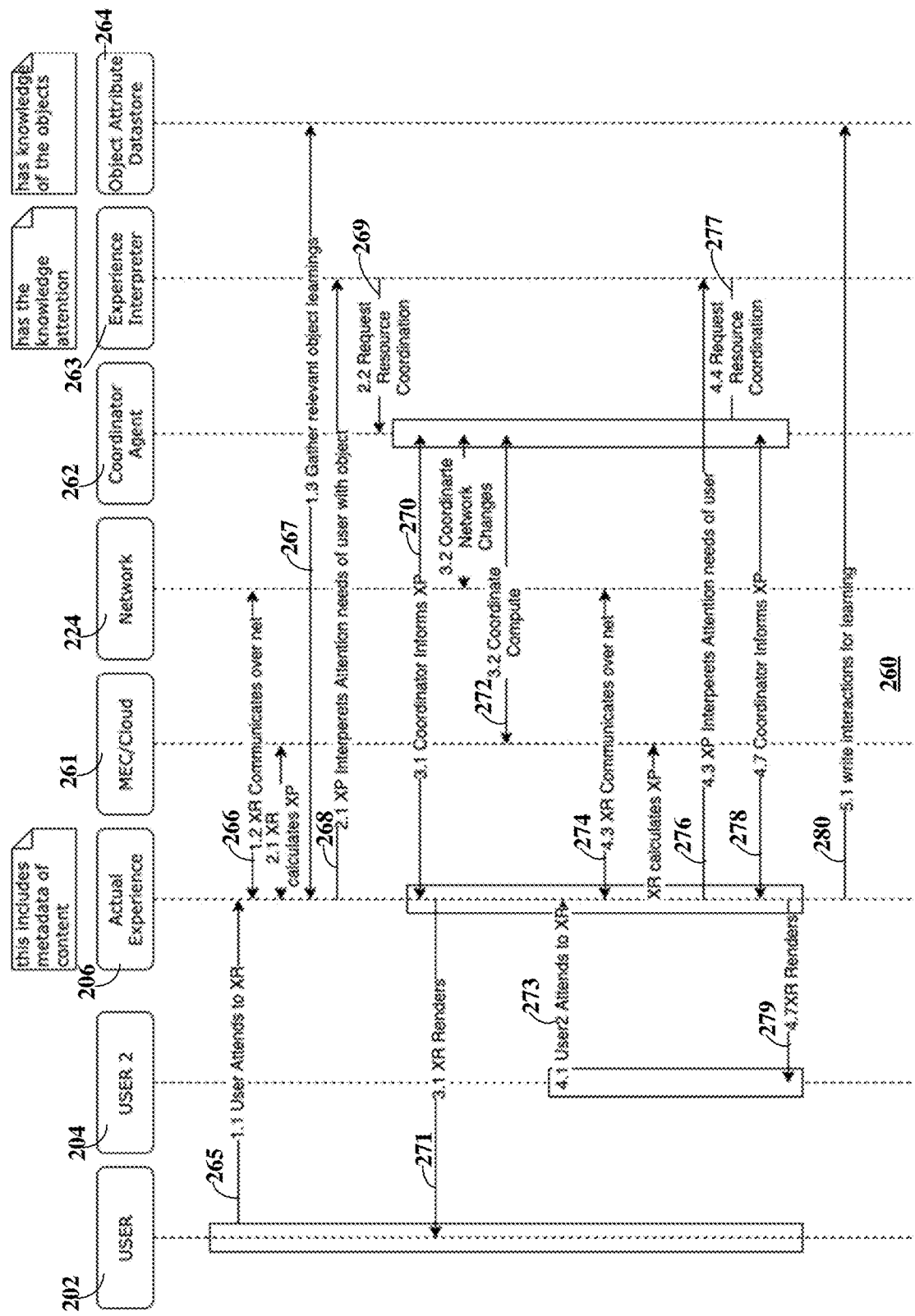
FIG. 2E depicts an illustrative embodiment of a method in accordance with various aspects described herein.

FIG. 2E depicts an illustrative embodiment of a method 260 in accordance with various aspects described herein. The method illustrates interaction by multiple users, including first user 202 and second user 204, with an XR experience 206. The XR experience 206 may be implemented by any data processing system, such as the XR server 220 implementing an XR engine 222, or by user computer 218, for example. The XR experience 206 refers to the view that is rendered by XR equipment such as an XR headset. The users 202, 204 may participate in the XR experience 206 using any suitable XR equipment such as XR headsets 208, 210. In some examples, there may be more than two users. Each user has access to suitable XR equipment to participate in the XR experience 206.

The embodiment of FIG. 2E further includes a multi-access edge computing-cloud (MEC/Cloud) arrangement 261. MEC/Cloud 261 includes a computing devices that enables edge computing and communication to the actual devices used by the users 202, 204. The MEC/Cloud 261 monitors the amount of data being sent to each device over whatever connection the device has available. The cloud represents a unifying network tying together all participating devices. A network, which may correspond to the communications network 224 of FIG. 2A, provides data communication.

Further, the exemplary embodiment of FIG. 2E includes a coordinator agent 262, an experience interpreter 263 and an object attribute data store 264. These features may be embodied in any convenient data processing system including for example, XR server 220 of FIG. 2A. They may be located and implemented together, in a common data processing system, or they may cooperate over one or more networks.

The coordinator agent 262 operates as a real-time metrics collection and machine learning system. In some example embodiments, the coordinator agent 262 learns and calculates information including computing resources and network resources. These may include data communication capacity such as bandwidth and end-to-end delay needed to support the desired immersive experience. These may include packet priorities for data packets being communicated in the system. Similarly, if network slices are used to support the immersive experience, the coordinator agent 262 may detect a need for one or more additional slices as the experience proceeds and coordinate the addition of such slices to the network. In exemplary embodiments, the coordinator agent 262 places orders and requests more resources from the network 224 or from the MEC/Cloud 261, in at least some instances in advance of actual need for additional resources.

In an example, the coordinator agent 262 determines that attention of users is focused on an object such as the ball in FIG. 2B and FIG. 2C and coordinates across all devices the motion of the ball as the ball is kicked.

The experience interpreter 263 operates to detect and prioritize regions and objects within a virtual world such as XR experience 206. The experience interpreter 263 determines which regions and objects are more important for some users. This determination may be based on any suitable information or criteria, such as an estimate of user attention based on interaction with other objects or region and an anticipated direction of travel. The experience interpreter 263 may access the object attribute data store 264 for information about objects. The experience interpreter 263 may assess the quality of an experience. In one example, three users are gathering around an X-Ray image. The experience interpreter 263 may assign a high value to a high resolution view of the X-Ray image. If the image is currently low resolution based on the finding of the experience interpreter 263, the experience interpreter 263 places a request to the coordinator agent 262 for a high-resolution texture image.

The experience interpreter 263 in some embodiments includes an AI engine that uses information such as the position of an XR headset used by a user, information about what the user is looking at and interacts with information of the object attribute data store 264 to determine what or where in the XR experience 206 the user is looking at, or the visual focus of the user.

The object attribute data store 264 is an object based No-SQL or SQL database containing information including metadata and recorded behaviors associated with objects inside and XR experience such as the XR experience 206. Data from the object attribute data store 26 may be used by the experience interpreter 263 for prediction of possibilities for attention as well as by the coordinator agent 262 for learning and anticipating resource needs and behaviors. In some embodiments, the object attribute data store 264 has an agent that continuously collects data on the actual XR experience 206 and saves historical metrics and metadata. The object attribute data store 264 in some examples saves information such as a game state and has information defining models and textures for objects and materials in the XR experience 206.

At step 265, the first user 202 attends to the XR experience 206. Generally, the first user 202 interacts with the XR experience in some fashion. The interaction operates to initialize communication over the network 224, step 266, and the MEC/Cloud 261 resources. Further, the interaction initiates operation of the coordinator agent 262, the experience interpreter 263 and the object attribute data store 248. At step 267, the XR experience 206 begins identifying and defining resources such as the make and model and capabilities of XR headsets used by user 202 and user 204 and then begins sharing appropriate information with those resources. The XR experience 206 retrieves necessary information from the object attribute data store 264. This can include retrieving information that was required or retrieved historically.

The first user 202 becomes active in the XR experience. This initiates the need for some coordination of the devices and the experience. This may involve any suitable activities, such as travelling within the virtual world created by the XR experience, seeing and hearing objects in the virtual world, interacting with objects in the virtual world, etc. At step 268, the XR experience 206 interprets the user attention to the experience interpreter 263. At step 269, the experience interpreter 263 requests resource coordination by the coordinator agent 262. The coordinator agent 262 detects the activity of the first user 202 and begins monitoring the activity. The coordinator agent 262 further determines what resources are available for coordination, both in the object attribute data store 264 and in the XR equipment such as user headsets. The coordinator agent 262 begins a coordination session.

At step 270, the coordinator agent 262 informs the XR experience 206 about what resources may be available for use by the XR experience in rendering the experience for the first user 202. At step 271, the XR experience renders the virtual world according to the resources that are available. The first user 202 begins to see the virtual world in the first user's headset or other XR equipment. If resources are limited, the rendered experience may be reduced or scoped.

At step 272, the coordinator agent 262 operates to coordinate computing resources and network resources to keep the scene and handle other immediate needs. For example, as the first user 202 moves through the virtual world, the coordinator agent 262 retrieves from the object attribute data store 264 the data necessary for rendering the virtual world in the XR experience 206. The coordinator agent 262 operates to predict the movements and actions of the first user 202 in the virtual world and to retrieve from the object attribute data store 264 resources such as data before the data are actually needed. In this manner, latency is minimized and the immersion is maintained for the first user 202.

Subsequently, the second user 204 logs in or attends to the XR experience 206, step 273. The XR experience 206 communicates over the network 224 to report the presence of the second user 204, step 274. The communication pertains to requirements of the second user, such as the headset capabilities of the second user, and the XR experience 206 receives information about what resources are currently available. In some embodiments, the XR experience 206 can pre-fetch information associated with the second user 204, such as profile information data necessary for animations, etc. The second user 204 begins interacting with the existing XR experience 206. The second user 204 sees objects and materials in the virtual world. The second user 204 may also see and interact with the first user 202 in the virtual world. In an example, the experience interpreter 263 predicts actions that the first user 202 and the second user 204 will travel together through the virtual world. Further, the experience interpreter 263 may in the example determine that the first user 202 and the second user, through their avatars, will begin to engage with an object. At step 277, the experience interpreter 263 will request resource coordination from the coordinator agent.

At step 278 and step 279, the coordinator agent 262 cooperates with the XR experience 206 to manage rendering of the immersion for the first user 202 and the second user 204. The coordinator agent 262 operates substantially in real time as the user 202, 204 interact with the virtual world. The coordinator agent 262 includes a machine learning system that learns from behavior of the users 202, 204 and makes predictions about their behavior and actions. Based on the predicted behavior, the coordinator agent 262 calculates require computing resources and network resources, such as needed bandwidth or other capacity. As more resources are required, the coordinator agent 262 requests more resources from, for example the network 224 and the MEC/Cloud 261. The XR experience 206 responds to user interaction and renders the immersion for the users 202, 204.

At step 280, the immersive experience terminates and the system responds by saving information about the completed experience. The information is stored, for example, in the object attribute data store 264. The stored information may include, for example, metadata and recorded behaviors associated with objects in the XR experience 206. Such information can be used subsequently by, for example, the experience interpreter 263 and the coordinator agent 262 for future operation of the XR experience. In one example, the stored information may indicate that certain objects in a XR experience are rarely seen or interacted with. Based on this, the XR system may respond by rendering the XR environment with those certain objects having a low priority or a low rendering fidelity, with a lesser degree of detail. This conserves rendering resources that may be used for other purposes, until those rendering resources are needed.

Storage and retrieval of the information about the completed experience simplifies and accelerates restarting the experience by the same user. In the case of an immersive game, the game state is saved for subsequent restart. The XR system in effect remembers where the user left off. Objects that were animated or modified will resume in that state. Objects that had a high priority, and were thus rendered in detail, retain that priority when the XR experience resumes.

The system and method in accordance with embodiments herein can further be used for training. The XR experience 206 may create a virtual version of, for example, a work space. As a user, such as user 1 proceeds through the work space performing work tasks, the experience interpreter 263 and the coordinator agent 262 learn the user's behaviors and performance. Using the learned behaviors, reported at step 280 to the object attribute data store 264, for example, the system and method can determine best practices for completing the necessary tasks in the work space. Subsequently, other workers can be trained in the same tasks, using the best practices, experienced immersively in the XR experience 206.

The system and method in accordance with the details described in conjunction with FIGS. 2A-2E provide a number of unique advantages. For example, the system and method permit an XR system to render in high fidelity only what is required, permitting optimal use of computing resources including rendering resources. Further, computing resources may be more optimally located or arranged in that computing resources and functions can be moved closer to the edge of a network, away from a user. Such resources may include resources for rendering, compression and audio streaming. Such resources may include gaming resources such as high-resolution images and a high resolution mesh.

Another benefit of the disclosed system and method pertains to gaming and educational or training applications, for example, such as an instructor- or leader-led XR experience. Such XR experiences may render based on the gaze or purposeful attention of the leader, as in FIG. 2D, to guide a student's focus to a particular area or object. An XR system responds to the leader's attention and renders the area or object in high quality.

In another benefit, triggering an XR environment for a primary user, such as a virtual tour guide, to direct attention of all participants so that network and computing resources can be managed by both the leader's actions and the coordinator agent to provide an optimum immersive experience.

In another benefit, a user can have preferences or limits that override or guide the experience quality. Such user information can be part of a user profile and can be communicated to the coordinator agent, for example, to throttle requests. This allows computing and rendering to be manually coordinated by a human in the loop.

A further benefit is a substantial reduction in required computing and network resources for XR experiences. Resources are assigned based on actual needs of the users of the system. This enables just-in-time consumption and assignment of resources and only to the level needed to provide the immersive experience.

A further benefit is enabling predictive XR behavior based on previous immersion experience and enabling a dynamic adjustment of network and computing resources. For example, in a virtual environment, a user moves toward a refrigerator to see what is inside. Based on the user's movement and other actions, the system can predict that the refrigerator door will be opened and render the inside just before the door is opened. The effect is to insert intelligence into the pipeline of delivering the XR experience.

While for purposes of simplicity of explanation, the respective processes are shown and described as a series of blocks in FIG. 2E, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 3, a block diagram of a communication network 300 is shown illustrating an example, non-limiting embodiment of a virtualized communication network in accordance with various aspects described herein. In particular a virtualized communication network is presented that can be used to implement some or all of the subsystems and functions of system 100, the subsystems and functions of system 200, and method 260 presented in FIGS. 1, 2A, 2B, 2C, 2D, 2D and 3. For example, virtualized communication network 300 can facilitate in whole or in part establishing an immersive environment accessible by users over the communication network 300, and assigning and reassigning rendering resources including resources of the communication network 300 based on user interactions in the immersive environment.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
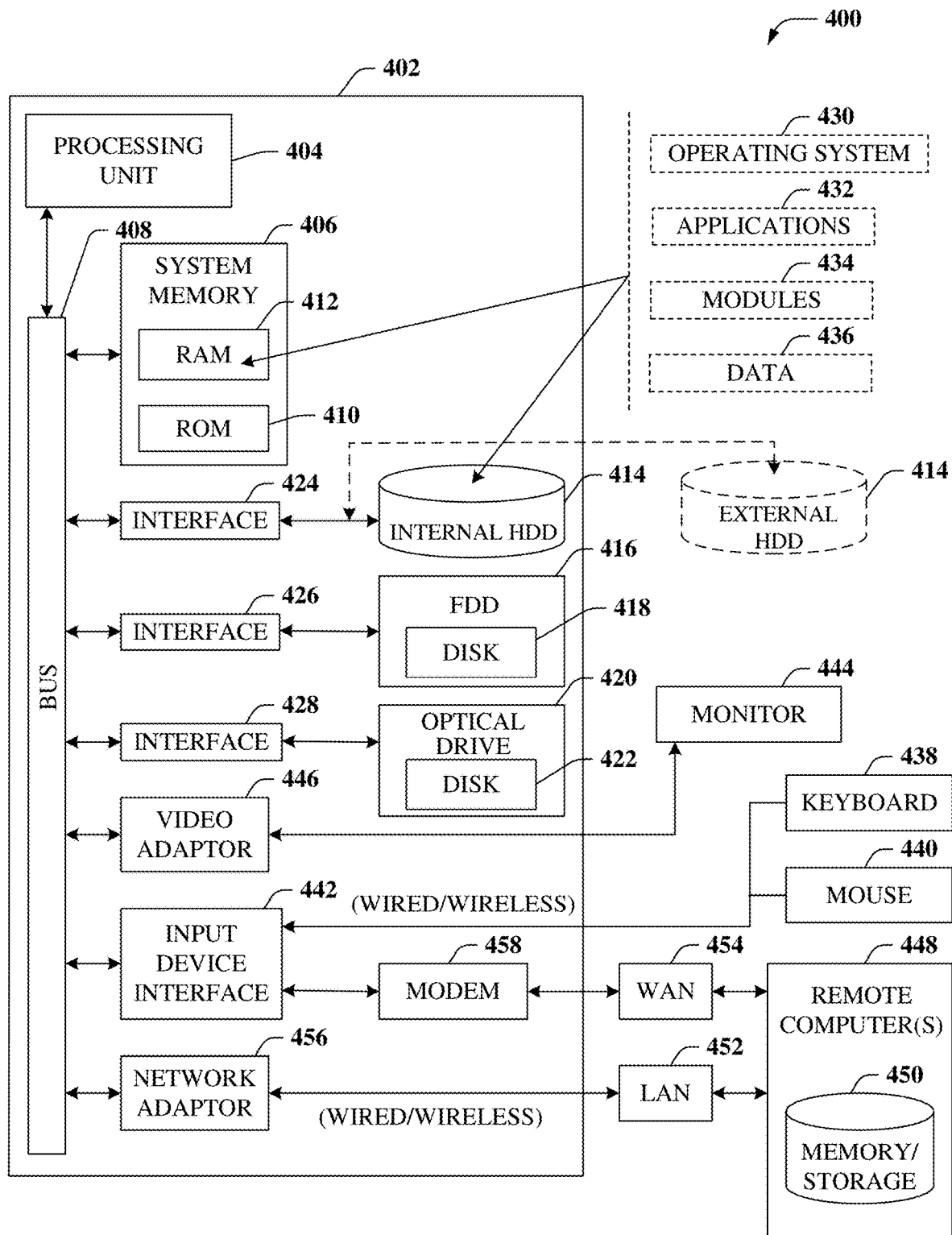
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part establishing an immersive environment accessible by users, and assigning and reassigning rendering resources based on user interactions in the immersive environment.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
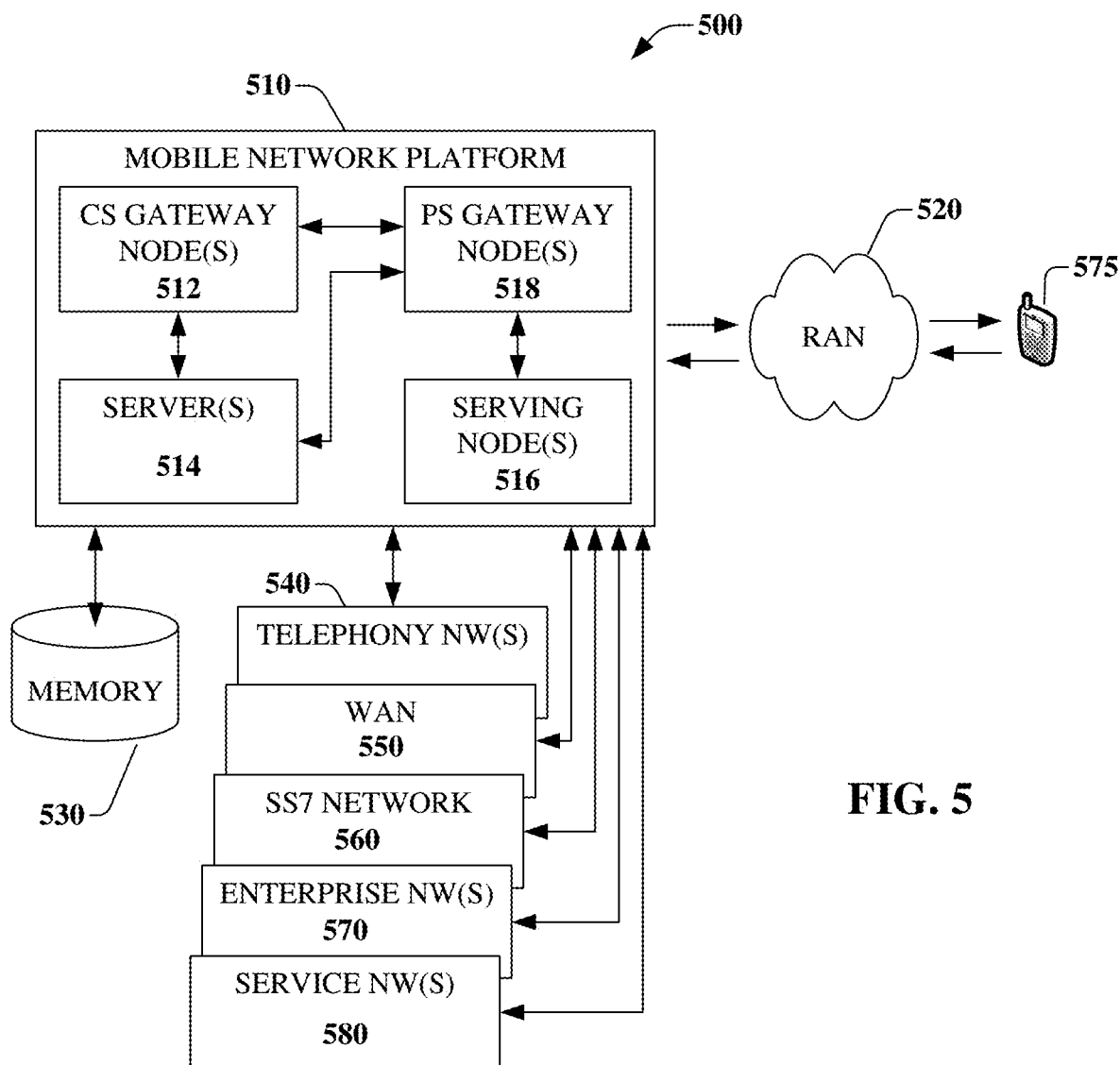
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part establishing an immersive environment accessible by users over a network including the mobile network platform, and assigning and reassigning rendering resources based on user interactions in the immersive environment. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technologies utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
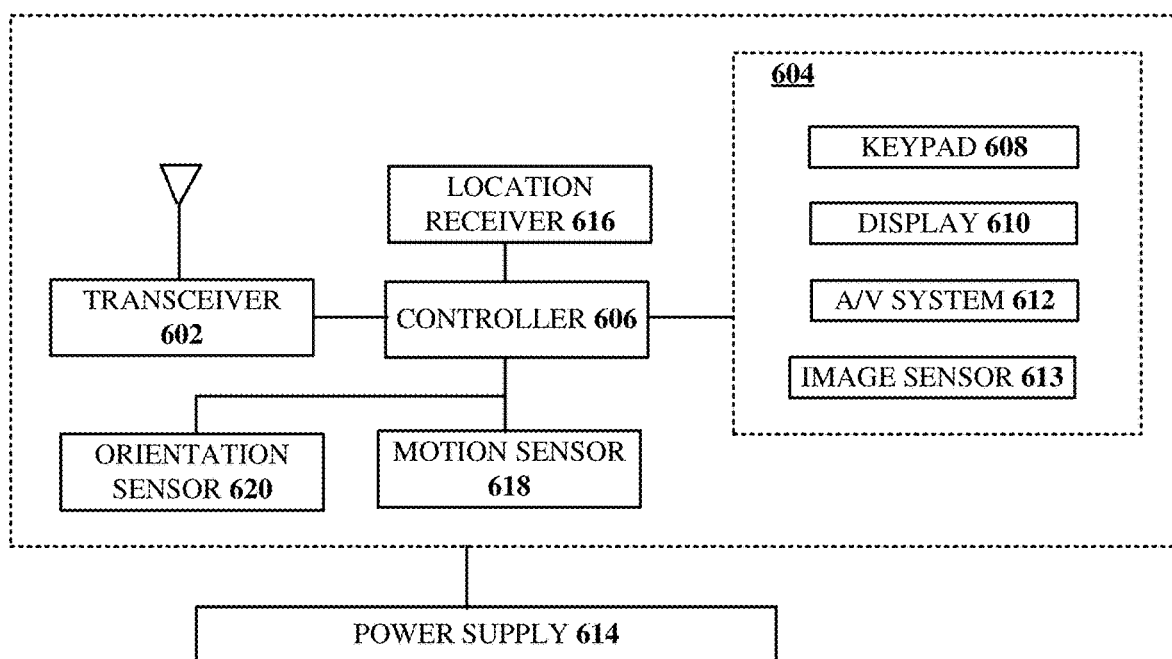
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part establishing an immersive environment accessible users, and assigning and reassigning rendering resources based on user interactions in the immersive environment.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SL-DRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)$ =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A method, comprising:
   providing, by a processing system including a processor, an immersive environment accessible by a plurality of user devices associated with a plurality of users;
   assigning, by the processing system, rendering resources for rendering the immersive environment;
   detecting, by the processing system, a user interaction by a user with a virtual object in the immersive environment;
   determining, by the processing system, a particular role of the user;
   assigning, by the processing system, a high priority to the user based on the particular role;
   rendering, by the processing system, the virtual object in full detail based on the high priority assigned to the user; and
   rendering, by the processing system, other objects in the immersive environment in less than full detail to reduce requirement for rendering resources for the immersive environment.

2. The method of claim 1, wherein the detecting of the user interaction by the user with the virtual object comprises:
   determining, by the processing system, that the user touches the virtual object.

3. The method of claim 1, wherein the detecting of the user interaction with the virtual object comprises:
   predicting, by the processing system, that the user is about to touch the virtual object.

4. The method of claim 1, wherein the detecting of the user interaction with the virtual object comprises:
   determining, by the processing system, that the user is looking at the virtual object.

5. The method of claim 1, wherein the detecting of the user interaction with the virtual object comprises:
   determining, by the processing system, that the user is travelling in a direction of the virtual object.

6. The method of claim 1, wherein the detecting of the user interaction with the virtual object comprises:
   determining, by the processing system, that the object is within an influence sphere of the user.

7. The method of claim 1, further comprising:
   assigning, by the processing system, additional rendering resources responsive to the user interaction with the virtual object; and
   rendering, by the processing system, the virtual object in full detail using the additional rendering resources.

8. The method of claim 1, further comprising terminating, by the processing system, the immersive environment.

9. The method of claim 8, further comprising:
   storing, by the processing system, data defining a state of the immersive environment, the data including information about recorded behaviors associated with the virtual object and the other objects by the plurality of users of the immersive environment, wherein the storing is responsive to the terminating of the immersive environment; and
   restarting, by the processing system, the immersive environment at a subsequent time, wherein the restarting comprises retrieving the data defining the state of the immersive environment.

10. The method of claim 9, wherein retrieving the data defining the state of the immersive environment comprises:
    retrieving, by the processing system, data defining user priorities for the plurality of users including the high priority assigned to the user based on the particular role.

11. A device, comprising:
    a processing system including a processor; and
    a memory that stores executable instructions that, when executed by the processing system, facilitate performance of operations, the operations comprising:
    establishing an immersive environment accessible by a plurality of users, each respective user accessing the immersive environment with a user computing device over a communications network;
    assigning rendering resources for the plurality of users;
    detecting a user interaction in the immersive environment by a user of the plurality of users, wherein the detecting of the user interaction comprises identifying an object that is subject of attention of the user, or identifying a direction of travel of the user, or combination of these;
    reassigning the rendering resources to accommodate the user interaction, wherein the reassigning of the rendering resources is responsive to the detecting the user interaction;
    predicting the object that is subject of attention of the user, wherein the predicting is based on past interactions with objects in the immersive environment; and
    requesting additional rendering resources for the object that is the subject of attention of the user before the user interacts with the object that is subject of attention of the user.

12. The device of claim 11, wherein the reassigning rendering resources to accommodate the user interaction comprises:
    reassigning network resources to fully render the object that is the subject of attention of the user.

13. The device of claim 12, wherein the reassigning rendering resources to accommodate the user interaction comprises:
    calculating only changes needing immersive calculation to maintain an immersive experience for the user.

14. The device of claim 13, wherein the calculating is responsive to expected travel by the user in the immersive environment.

15. The device of claim 13, wherein the calculating is responsive to a predicted change of attention by the user in the immersive environment.

16. A non-transitory, machine-readable medium, comprising executable instructions that, when executed by a processing system including a processor, facilitate performance of operations, the operations comprising:

establishing an immersive environment accessible by a plurality of users, each respective user accessing the immersive environment with a user computing device over a communications network;

determining rendering resources required by each respective user of the plurality of users, the rendering resources sufficient to support an immersive experience for each respective user;

prioritizing objects within the immersive environment to form an object priority, wherein the prioritizing is according to a priority to a respective user, wherein the prioritizing is based on estimating an attention level of the respective user on the objects;

adjusting the rendering resources assigned to each respective user according to the object priority, wherein the adjusting reduces rendering resources for objects having less than a highest object priority;

prioritizing the respective user according to a role of the respective user in the immersive environment, wherein the prioritizing the respective user comprises assigning a user priority to the respective user;

detecting an interaction by the respective user with a particular virtual object in the immersive environment; and prioritizing the particular virtual object according to the user priority based on the interaction by the respective user with the particular virtual object.

17. The non-transitory, machine-readable medium of claim 16, wherein the operations further comprise:
rendering only objects having the highest object priority in full detail.

18. The non-transitory, machine-readable medium of claim 16, wherein the operations further comprise:
rendering the particular virtual object in full detail in the immersive environment.

19. The non-transitory, machine-readable medium of claim 16, wherein the adjusting of the rendering resources comprises:
increasing a communication capacity on the communications network for a respective user of the plurality of users.

20. The non-transitory, machine-readable medium of claim 19, wherein the increasing of the communication capacity is based on a predicted interaction by the respective user in the immersive environment.

* * * * *